United States Patent
Satoh et al.

(10) Patent No.: US 11,127,975 B2
(45) Date of Patent: Sep. 21, 2021

(54) ALL SOLID BATTERY AND MANUFACTURING METHOD OF THE SAME

(71) Applicant: TAIYO YUDEN CO., LTD., Tokyo (JP)

(72) Inventors: Takato Satoh, Takasaki (JP); Daigo Ito, Takasaki (JP); Sachie Tomizawa, Takasaki (JP); Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 58 days.

(21) Appl. No.: 16/572,331

(22) Filed: Sep. 16, 2019

(65) Prior Publication Data

US 2020/0106129 A1   Apr. 2, 2020

(30) Foreign Application Priority Data

Sep. 27, 2018  (JP) .............................. JP2018-182878

(51) Int. Cl.
  *H01M 10/0562* (2010.01)
  *H01M 4/04* (2006.01)
  *H01M 10/0525* (2010.01)

(52) U.S. Cl.
  CPC ....... *H01M 10/0562* (2013.01); *H01M 4/049* (2013.01); *H01M 10/0525* (2013.01); *H01M 2300/0068* (2013.01)

(58) Field of Classification Search
  CPC ........... H01M 10/0525; H01M 10/056; H01M 10/0562; H01M 10/058; H01M 2300/0068; H01M 2300/0082; H01M 2300/0085; H01M 2300/0088; H01M 4/049
  See application file for complete search history.

(56) References Cited

U.S. PATENT DOCUMENTS

2007/0172739 A1* 7/2007 Visco ...................... H01M 4/62
                                                   429/322

FOREIGN PATENT DOCUMENTS

WO    2017033765 A1    3/2017

OTHER PUBLICATIONS

Inda et al., Development of all-solid lithium-ion battery using Li-ion conducting glass-ceramics, Journal of Power Sources, Jul. 3, 2007, pp. 741-744, vol. 174 (4 pages).

* cited by examiner

*Primary Examiner* — Carlos Barcena
(74) *Attorney, Agent, or Firm* — Law Office of Katsuhiro Arai

(57) ABSTRACT

An all solid battery includes: a solid electrolyte layer including solid electrolyte; a first electrode layer that is formed on a first main face of the solid electrolyte layer and includes an active material; and a second electrode layer that is formed on a second main face of the solid electrolyte layer and includes an active material, wherein the solid electrolyte layer includes polymer solid electrolyte including lithium salt, in a clearance of a sintered compact of phosphoric acid salt-based solid electrolyte.

10 Claims, 6 Drawing Sheets

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2018-182878, filed on Sep. 27, 2018, the entire contents of which are incorporated herein by reference.

FIELD

A certain aspect of the present invention relates to an all solid battery and a manufacturing method of the all solid battery.

BACKGROUND

For the purpose of achieving safety and favorable characteristic, there is developed all solid batteries in which organic polymer solid electrolyte and inorganic solid electrolyte are composited. There is disclosed a technology in which a solid electrolyte layer having polymer solid electrolyte and inorganic solid electrolyte which are composited with each other has favorable ionic conductivity (for example, see International Publication No. WO2017/033765 hereinafter referred to as Document 1 and Journal of Power Source 174 (2007) 741-744 hereinafter referred to as Document 2). In Document 1, precursor solution of polymer electrolyte is coated on a solid electrolyte sheet, and polymer solid electrolyte is impregnated into solid electrolyte be heating. In Document 2, solid electrolyte and polymer solid electrolyte co-exist in slurry.

SUMMARY OF THE INVENTION

In the above-mentioned technology, a firing process is not performed during compositing the polymer solid electrolyte and the inorganic solid electrolyte. Therefore, ionic conduction paths using necking of the inorganic solid electrolyte is not secured. Temperature dependence of the ionic conductivity is not Arrenius type. Therefore, the ionic conductivity is largely reduced at a low temperature.

The present invention has a purpose of providing an all solid battery that is capable of suppressing reduction of ionic conductivity at a low temperature, and a manufacturing method of the all solid battery.

According to an aspect of the present invention, there is provided an all solid battery including: a solid electrolyte layer including solid electrolyte; a first electrode layer that is formed on a first main face of the solid electrolyte layer and includes an active material; and a second electrode layer that is formed on a second main face of the solid electrolyte layer and includes an active material, wherein the solid electrolyte layer includes polymer solid electrolyte including lithium salt, in a clearance of a sintered compact of phosphoric acid salt-based solid electrolyte.

According to an aspect of the present invention, there is provided a manufacturing method of an all solid battery including: forming a sintered compact of phosphoric acid salt-based solid electrolyte from a green sheet including grains of the phosphoric acid salt-based solid electrolyte, by firing a multilayer structure in which first coated electrode paste, the green sheet and second coated electrode paste are stacked in this order; and impregnating precursor solution of polymer solid electrolyte including lithium salt, into a clearance of the sintered compact.

DETAILED DESCRIPTION

A description will be given of an embodiment with reference to the accompanying drawings.

Figure 1:
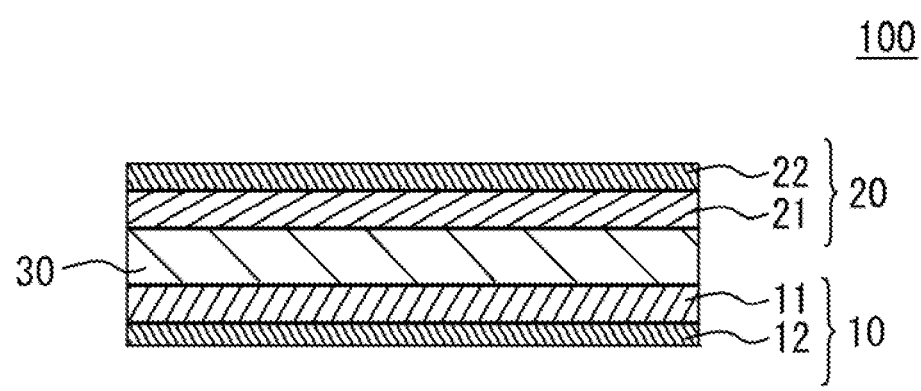
FIG. 1 illustrates a schematic cross section of an all solid battery.

FIG. 1 illustrates a schematic cross section of an all solid battery 100. As illustrated in FIG. 1, the all solid battery 100 has a structure in which a first electrode 10 and a second electrode 20 sandwich a solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

In the all solid battery 100, during charging, ions are released from an active material of the first electrode layer 11 and move to the second electrode layer 21 via the solid electrolyte layer 30. During discharging, the ions return to the active material of the first electrode layer 11 via the solid electrolyte layer 30. Therefore, ionic conductivity of the solid electrolyte layer 30 has a large influence on the all solid battery 100.

The solid electrolyte layer 30 includes phosphoric acid salt-based solid electrolyte and a polymer solid electrolyte including lithium salt. That is, the solid electrolyte layer 30 has a structure in which the phosphoric acid salt-based solid electrolyte and the polymer solid electrolyte are composited. When the phosphoric acid salt-based solid electrolyte is added, safety is largely improved, in comparison to a battery including organic electrolyte solution. Moreover, when the polymer solid electrolyte is added, it is possible to easily form an interface between the solid electrolyte layer 30 and the active material in the electrode layers. However, there is a demerit that ionic conductivity of the polymer solid electrolyte is low at a low temperature. When the phosphoric acid salt-based and the polymer solid electrolyte simply co-exist, temperature dependence of the ionic conductivity is not Arrenius type. It is therefore difficult to suppress reduction of the ionic conductivity at a low temperature.

Figure 2:
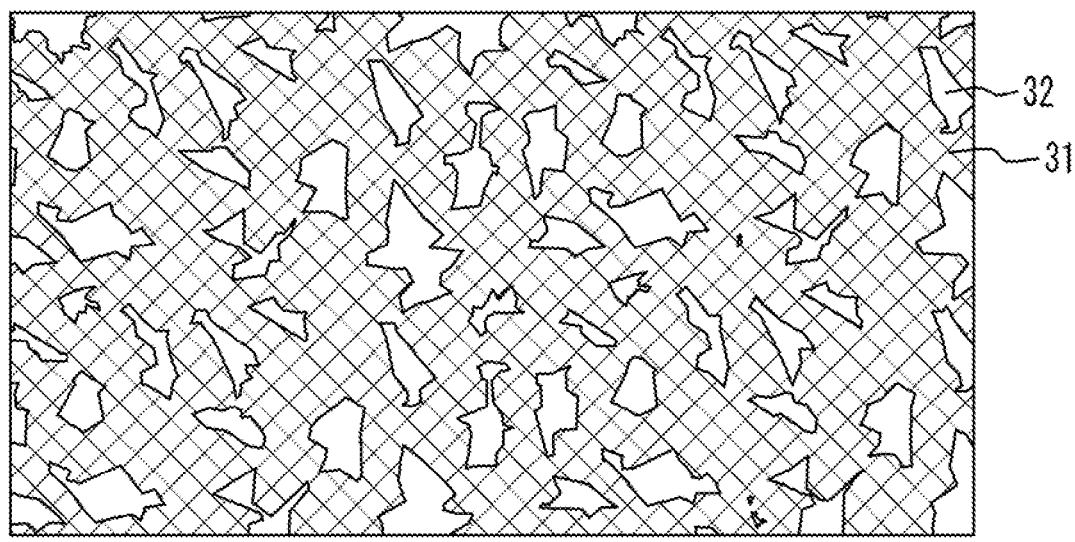
FIG. 2 illustrates a three dimensional network structure.

And so, in the embodiment, the solid electrolyte layer 30 includes a sintered compact 31 of a phosphoric acid salt-based solid electrolyte having a three dimensional network structure, as illustrated in FIG. 2. The polymer solid electrolyte is located in a clearance 32 of the three dimensional network structure. In the structure, the phosphoric acid salt-based solid electrolyte has the three dimensional network structure. Therefore, ionic conduction paths using necking of the phosphoric acid salt-based solid electrolyte is secured. It is therefore possible to suppress reduction of the ionic conduction at a low temperature.

When a relative density of the phosphoric acid salt-based solid electrolyte (actual density/theoretical density) is excessively small, sufficient ionic conduction may not be necessarily achieved. And so, in the embodiment, the relative density of the phosphoric acid salt-based solid electrolyte has a lower limit. In concrete, the relative density of the phosphoric acid salt-based solid electrolyte is 55% or more. On the other hand, a firing temperature is increased in order to increase the relative density of the phosphoric acid salt-based solid electrolyte. When the firing temperature is excessively high, the electrode layer and the solid electrolyte layer react with each other in the firing process. In this case, the active material is hardly left in the electrode layer. And so, in the embodiment, the relative density of the phosphoric acid salt-based solid electrolyte has an upper limit. In concrete, the relative density of the phosphoric acid salt-based solid electrolyte is 90% or less. When the relative density has the upper limit and the lower limit, sufficient ionic conduction is achieved and a sufficient amount of the active material is left in the electrode layer. For example, in the solid electrolyte layer 30, it is preferable that {ionic conductivity at a room temperature $(S \cdot cm^{-1})$}/{relative density of phosphoric acid salt-based solid electrolyte (%)}$\times 10^8$ is 2 or more. It is more preferable that {ionic conductivity at a room temperature $(S \cdot cm^{-1})$}/{relative density of phosphoric acid salt-based solid electrolyte (%)}$\times 10^8$ is 10 or more. It is still more preferable that {ionic conductivity at a room temperature $(S \cdot cm^{-1})$}/{relative density of phosphoric acid salt-based solid electrolyte (%)}$\times 10^8$ is 20 or more. The room temperature is 25 degrees C.

The phosphoric acid salt-based solid electrolyte is not limited. It is possible to use phosphoric acid salt-based solid electrolyte having a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte.

The polymer solid electrolyte in the solid electrolyte layer 30 includes a lithium salt and a polymer. For example, polyethylene oxide or the like can be used as the polymer included in the polymer solid electrolyte. The polymer may be such as polymethacrylate, polymethacrylic acid amide, polyether, polyester, polyamide, polysiloxane, polyurethane, polyurea, or polyimide. The polymer may be at least one of a polyalkylene oxide structure, a polysiloxane structure, and a polycarbonate structure. A side chain may be at least one of the polyalkylene oxide structure, the polysiloxane structure, and the polycarbonate structure.

It is preferable that a glass transition temperature of these polymers is less than 40 degrees C. It is more preferable that the glass transition temperature is −70 degrees C. or more and less than 20 degrees C. It is still more preferable that the glass transition temperature is −40 degrees C. or more and less than 10 degrees C. In particular, it is still more preferable that the glass transition temperature is −30 degrees C. or more and less than 0 degrees C. When the glass transition temperature is within these temperature ranges, the ionic conductivity can be increased. It is preferable that a mass-average molecular weight of the polymers is 10000 to 200000. It is more preferable that the mass-average molecular weight is 30000 to 100000. It is preferable that the polymer has a crosslinked structure.

The lithium salt included in the polymer solid electrolyte in the solid electrolyte layer 30 is such as (L-1) inorganic lithium salt: inorganic fluoride salt such as $LiPF_6$, $LiBF_4$, or $LiAsF_6$; perhalogen acid salt such as $LiClO_4$, $LiBrO_4$ or $LiIO_4$; inorganic chloride salt such as $LiAlCl_4$.

The lithium salt may be (L-2) fluorine-containing organo-lithium salt: perfluoroalkane sulfonate ($LiRf^1SO_3$)) such as $LiCF_3SO_3$; $LiN(FSO_2)_2$; perfluoroalkanesulfonyl imide salt ($LiN(Rf^1SO_2)_2$ or $LiN(Rf^1SO_2)(Rf^2SO_2)$) such as $LiN(CF_3SO_2)_2$, $LiN(CF_3CF_2SO_2)_2$ or $LiN(CF_3SO_2)(C_4F_9SO_2)$; perfluoroalkanesulfonyl methide salt such as $LiC(CF_3SO_2)_3$; fluoroalkyl fluorophosphates salt such as $Li[PF_5(CF_2CF_2CF_3)]$, $Li[PF_4(CF_2CF_2CF_3)_2]$, $Li[PF_3(CF_2CF_2CF_3)_3]$, $Li\{PF_5(CF_2CF_2CF_2CF_3)\}$, $Li[PF_4(CF_2CF_2CF_2CF_3)_2]$ or $Li[PF_3(CF_2CF_2CF_2CF_3)_3]$. $Rf^1$ and $Rf^2$ independently mean perfluoroalkyl groups.

The lithium salt may be (L-3) oxalate borate salt such as lithium bis (oxalate) borate or lithium difluorooxalate borate. Among these salts, $LiPF_6$, $LiBF_4$, $LaAsF_6$, $LiSbF_6$, $LiClO_4$, $Li(Rf^1SO_3)$ or lithium imide salt may be used as the lithium salt. The lithium imide salt is such as $LiN(FSO_2)_2$, $LiN(Rf^1SO_2)_2$ or $LiN(Rf^1SO_2)(Rf2SO_2)$. $Rf^1$ and $Rf^2$ independently mean perfluoroalkyl groups. The lithium salt may be such as $LiN(CF_3SO_2)_2$[LiTFSI].

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

The first electric collector layer 12 and the second electric collector layer 22 are made of a conductive material.

Figure 3:
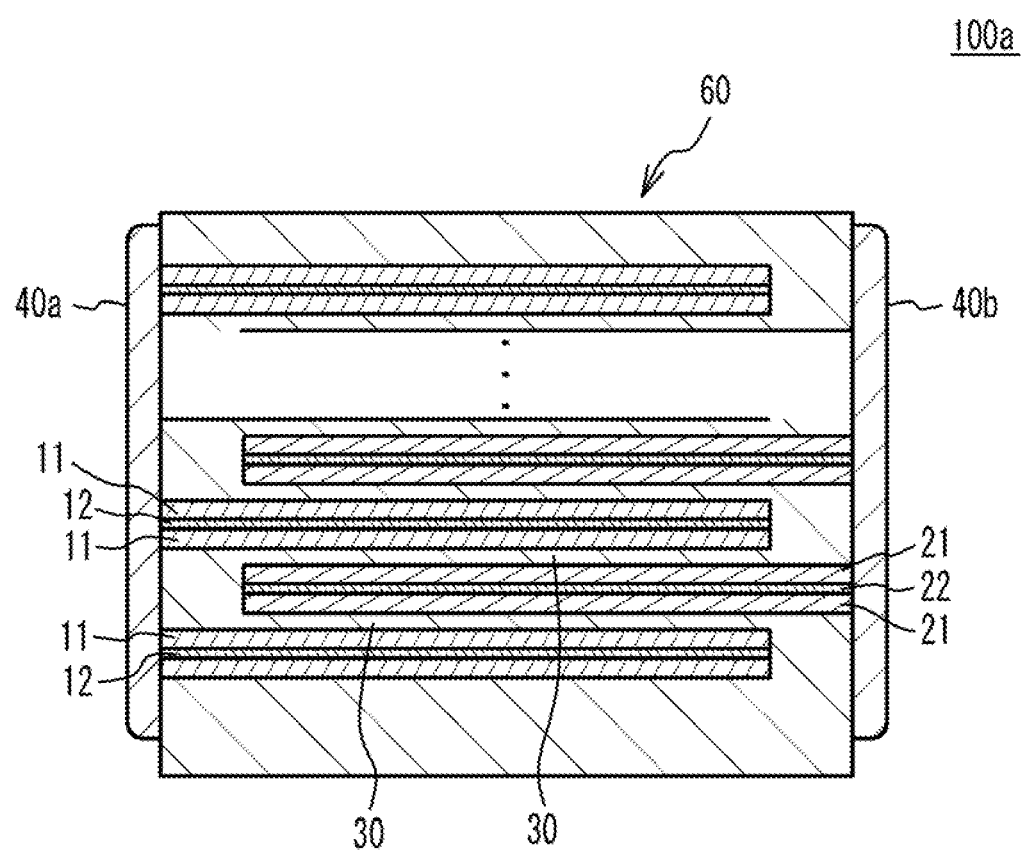
FIG. 3 illustrates a schematic cross section of another all solid battery.

FIG. 3 illustrates a schematic cross section of an all solid battery 100a in accordance with another embodiment. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face. In the following description, the same numeral is added to each member that is the same as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first electrode layer 11 is stacked on the first electric collector layer 12. The solid electrolyte layer 30 is stacked on the first electrode layer 11. The solid electrolyte layer 30 extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

Figure 4:
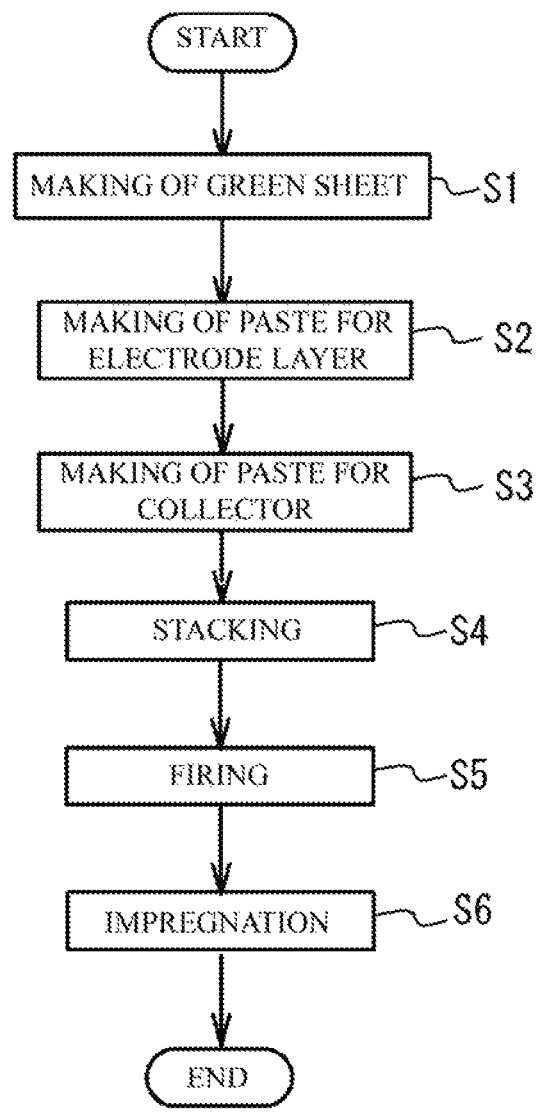
FIG. 4 illustrates a flowchart of a manufacturing method of an all solid battery.

FIG. 4 illustrates a flowchart of the manufacturing method of the all solid battery 100 and the all solid battery 100a.

(Making process of green sheet) Powder of the phosphoric acid salt-based solid electrolyte structuring the solid electrolyte layer 30 is made. For example, it is possible to make the powder of the phosphoric acid salt-based solid electrolyte structuring the solid electrolyte layer 30, by mixing raw material and additives and using solid phase synthesis method or the like. The resulting powder is subjected to dry grinding. Thus, a grain diameter of the resulting power is adjusted to a desired one. For example, the grain diameter of the resulting power is adjusted to a desired one by a planetary ball mil using $ZrO_2$ balls having a diameter of 5 mm φ.

The resulting powder is evenly dispersed into aqueous solvent or organic solvent together with a binding agent, a dispersing agent, a plasticizer and so on. The resulting power is subjected wet crushing. And solid electrolyte slurry having a desired grain diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is coated. Thus, a green sheet is obtained. The coating method is not limited. For example, a slot die method, a reverse coat method, a gravure coat method, a bar coat method, a doctor blade method or the like may be used. It is possible to measure grain diameter distribution after the wet crushing, with use of a laser diffraction measuring device using a laser diffraction scattering method.

(Making process of paste for electrode layer) Next, paste for electrode layer is made in order to make the first electrode layer 11 and the second electrode layer 21. For example, a conductive auxiliary agent, an active material, a solid electrolyte material, a binder, a plasticizer and so on are evenly dispersed into water or organic solvent. Thus, paste for electrode layer is obtained. The above-mentioned solid electrolyte paste may be used as the solid electrolyte material. Carbon materials may be used as the conductive auxiliary agent. When the composition of the first electrode layer 11 is different from that of the second electrode layer 21, paste for electrode layer used for the first electrode layer 11 and another paste for electrode layer used for the second electrode layer 21 may be individually made.

(Making process of paste for electric collector) Next, paste for electric collector is made in order to make the first electric collector layer 12 and the second electric collector layer 22. It is possible to make the paste for electric collector, by evenly dispersing powder of Pd, a binder, dispersant, plasticizer and so on into water or organic solvent.

(Stacking process) The paste for electrode layer and the paste for electric collector are printed on both faces of the green sheet, with respect to the all solid battery 100 described on the basis of FIG. 1. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary.

Figure 5:
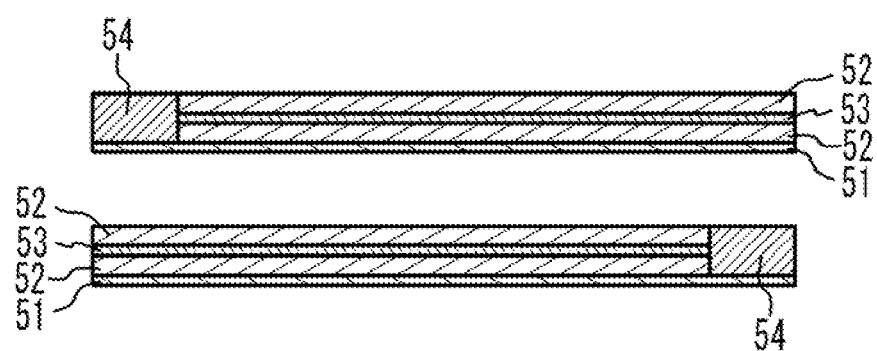
FIG. 5 illustrates a stacking process.

With respect to the all solid battery 100a described on the basis of FIG. 2, paste 52 for electrode layer is printed on one face of a green sheet 51 as illustrated in FIG. 5. Paste 53 for electric collector is printed on the paste 52 for electrode layer. And, another paste 52 for electrode layer is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, in the multilayer structure, a pair of the paste 52 for electrode layer and the paste 53 for electric collector are alternately exposed to the two edge faces of the multilayer structure.

(Firing process) Next, the resulting multilayer structure is fired. In the embodiment, the multilayer structure is fired in a low temperature range in which the green sheet and the paste for electrode layer do not react with each other. Thus, a coarse sintered compact of the phosphoric acid salt-based solid electrolyte is made from the green sheet. The lower the maximum temperature of the firing process (hereinafter referred to as a firing temperature) is, the lower (coarse) the relative density of the sintered compact of the phosphoric acid salt-based solid electrolyte is. Thus, the three dimensional network structure of the phosphoric acid salt-based solid electrolyte is formed.

When the firing temperature is excessively low, the relative density of the sintered compact of the phosphoric acid salt-based solid electrolyte gets lower. In this case, sufficient ionic conduction may not be necessarily achieved. And so, it is preferable that the firing temperature has a lower limit. On the other hand, when the firing temperature is excessively high, an amount of the active material left in the first electrode layer 11 and the second electrode layer 21 is reduced and the battery operation may not be necessarily achieved. And so, it is preferable that the firing temperature has an upper limit. For example, it is preferable that the firing temperature has a lower limit so that the relative density of the phosphoric acid salt-based solid electrolyte is 55% or more. On the other hand, it is preferable that the firing temperature has an upper limit so that the relative density of the phosphoric acid salt-based solid electrolyte is 90% or less. For example, it is preferable that the firing temperature is 550 degrees C. or more, when Li—Al—Ge—P—O-based electrolyte is used as the phosphoric acid salt-based solid electrolyte. It is more preferable that the firing temperature is 600 degrees C. or more. It is still more preferable that the firing temperature is 650 degrees C. or more. It is preferable that the firing temperature is 800 degrees C. or less. It is more preferable that the firing temperature is 750 degrees C. or less. It is still more preferable that the firing temperature is 700 degrees C. or less.

In order to sufficiently remove the binder until the maximum temperature, a process for keeping a temperature lower than the maximum temperature in an oxidizing atmosphere may be performed. It is preferable that the firing is performed in the lowest possible temperature, from a viewpoint of reduction of the process cost. After the firing, a re-oxidizing process may be performed.

(Impregnation process) Next, precursor solution of a solid polymer electrolyte was made by adding the polymer and the lithium salt to solvent. The solvent is such as acetonitrile, ethylene carbonate (EC), propylene carbonate (PC), butylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxyethane, 1,3-dimethoxypropane, dimethylether, tetrahydrofuran (THF), or 2-methyltetrahydrofuran.

For example, polyethylene oxide or the like can be used as the polymer. The polymer may be such as polymethacrylate, polymethacrylic acid amide, polyether, polyester, polyamide, polysiloxane, polyurethane, polyurea, or polyimide. The polymer may be at least one of a polyalkylene oxide structure, a polysiloxane structure, and a polycarbonate structure. A side chain may be at least one of the polyalkylene oxide structure, the polysiloxane structure, and the polycarbonate structure.

It is preferable that a glass transition temperature of these polymers is less than 40 degrees C. It is more preferable that the glass transition temperature is −70 degrees C. or more and less than 20 degrees C. It is still more preferable that the glass transition temperature is −40 degrees C. or more and less than 10 degrees C. In particular, it is still more preferable that the glass transition temperature is −30 degrees C. or more and less than 0 degrees C. When the glass transition temperature is within these temperature ranges, the ionic conductivity can be increased. It is preferable that a mass-average molecular weight of the polymers is 10000 to 200000. It is more preferable that the mass-average molecular weight is 30000 to 100000. It is preferable that the polymer has a crosslinked structure.

The lithium salt is such as (L-1) inorganic lithium salt: inorganic fluoride salt such as $LiPF_6$, $LiBF_4$, $LiAsF_6$ or $LiSbF_6$; perhalogen acid salt such as $LiClO_4$, $LiBrO_4$ or $LiIO_4$; inorganic chloride salt such as $LiAlCl_4$.

The lithium salt may be (L-2) fluorine-containing organolithium salt: perfluoroalkane sulfonate ($LiRf^1SO_3$)) such as $LiCF_3SO_3$; $LiN(FSO_2)_2$; perfluoroalkanesulfonyl imide salt ($LiN(Rf^1SO_2)_2$ or $LiN(Rf^1SO_2)(Rf^2SO_2)$) such as LiN$(CF_3SO_2)_2$, $LiN(CF_3CF_2SO_2)_2$ or $LiN(CF_3SO_2)(C_4F_9SO_2)$; perfluoroalkanesulfonyl methide salt such as $LiC(CF_3SO_2)_3$; fluoroalkyl fluorophosphates salt such as $Li[PF_5(CF_2CF_2CF_3)]$, $Li[PF_4(CF_2CF_2CF_3)_2]$, $Li[PF_3(CF_2CF_2CF_3)_3]$, $Li\{PF_5(CF_2CF_2CF_2CF_3)\}$, $Li[PF_4(CF_2CF_2CF_2CF_3)_2]$ or $Li[PF_3(CF_2CF_2CF_2CF_3)_3]$. $Rf^1$ and $Rf^2$ independently mean perfluoroalkyl groups.

The lithium salt may be (L-3) oxalate borate salt such as lithium bis (oxalate) borate or lithium difluorooxalate borate. Among these salts, $LiPF_6$, $LiBF_4$, $LaAsF_6$, $LiSbF_6$, $LiClO_4$, $Li(Rf^1SO_3)$ or lithium imide salt may be used as the lithium salt. The lithium imide salt is such as $LiN(FSO_2)_2$, $LIN(Rf^1SO_2)_2$ or $LiN(Rf^1SO_2)(Rf2SO_2)$. $Rf^1$ and $Rf^2$ independently mean perfluoroalkyl groups. The lithium salt may be such as $LiN(CF_3SO_2)_2$[LiTFSI].

Next, the sintered compact formed in the firing process is dipped into precursor solution. Thus, the precursor solution is impregnated into the sintered compact of the phosphoric acid salt-based solid electrolyte. An impregnating method is not limited. For example, the sintered compact may be completely dipped into the precursor solution and may be left until solvent is vaporized in a dry room at a room temperature. Alternatively, a high vacuum impregnating method may be adopted. When polymer on a surface is removed by grinding, the all solid battery 100 or the all solid battery 100a is manufactured.

In the manufacturing method of the embodiment, the solid polymer electrolyte is impregnated into the three dimensional network structure of the phosphoric acid salt-based solid electrolyte. In this case, ionic conduction paths are obtained by necking. Thus, the ionic conductivity within a low temperature range is improved, in comparison to a case where the phosphoric acid salt-based solid electrolyte and the polymer solid electrolyte simply co-exist with each other.

EXAMPLES

The all solid batteries in accordance with the embodiment were made and the property was measured.

Examples 1 to 6 and Comparative Examples 1 to 4

Phosphoric acid salt-based solid electrolyte having a desirable grain diameter was dispersed into dispersion medium. Thus, solid electrolyte slurry was prepared. $Li_{1.3}Al_{0.3}Ge_{1.7}(PO_4)_3$ was used as the phosphoric acid salt-based solid electrolyte. A binder was added to the solid electrolyte slurry. Thus, solid electrolyte paste was prepared. A green sheet was made by coating the solid electrolyte paste. Next, an electrode active material, solid electrolyte and a conductive auxiliary agent were weighed in a wet bead mill. The electrode active material, the solid electrolyte and the conductive auxiliary agent were kneaded together with a solvent and a binder. Thus, slurry was obtained. The slurry was coated. Thereby, an electrode sheet was formed. $LiCoPO_4$ was used as the electrode active material. $Li_{1.3}Al_{0.3}Ti_{1.7}(PO_4)_3$ was used as the solid electrolyte. Pd was used as the conductive auxiliary agent. Next, Pd powder was coated. Thereby, an electric collector sheet was formed. A plurality of green sheets were stacked. The stacked green sheets were used as a solid electrolyte layer. The electrode sheet and the electric collector sheet were stacked on both an upper face and a lower face of the solid electrolyte layer. The resulting structure was stamped into a disk shape. The disk was used as a sample.

The sample was fired. Thus, a sintered compact was obtained. Next, 7.2 g of polyethylene oxide (molecular weight: 1 million), 2.4 g of lithium bis (LiTFSI) and 328.8 g of acetonitrile were mixed. Thus, precursor solution of the solid polymer electrolyte was made. Each sintered compact of the examples 1 to 6 and the comparative examples 1, 3 and 4 was completely dipped into the precursor solution and was left until solvent was vaporized in a dry room at a room temperature. After that, the polymer on a surface was removed by grinding. The sintered compact of the comparative example 2 was not dipped into the precursor solution.

Comparative Example 5

In a comparative example 5, the phosphoric acid salt-based solid electrolyte was not used. The solid electrolyte layer 30 was made from only the polymer solid electrolyte. The material of the polymer solid electrolyte was the same as those of the examples 1 to 6 and the comparative examples 1 to 4. The solid electrolyte layer 30 was sandwiched by SUS boards acting as electric collectors, and was sealed in a coin cell.

Table 1 shows manufacturing conditions and the measured results of the examples 1 to 6 and the comparative examples 1 to 5. Table 2 shows criterion.

TABLE 1

| | FIRING TEMPERATURE (° C.) | RELATIVE DENSITY (%) | SURVIVAL OF ACTIVE MATERIAL | IMPREGNATION | IONIC CONDUCTIVITY AT ROOM TEMPERATURE $\sigma(S \cdot cm^{-1})$ | IONIC CONDUCTIVITY/ DENSITY | DETERMINATION |
|---|---|---|---|---|---|---|---|
| COMPARATIVE EXAMPLE 1 | 500 | 53.4 | ◎ | DONE | $5.7 \times 10^{-7}$ | 1.1 | X | NG |
| EXAMPLE 1 | 550 | 57.5 | ◎ | DONE | $1.3 \times 10^{-6}$ | 2.3 | Δ | OK |
| EXAMPLE 2 | 600 | 60.4 | ◎ | DONE | $3.1 \times 10^{-6}$ | 5.1 | Δ | OK |
| EXAMPLE 3 | 650 | 68.2 | ◎ | DONE | $4.2 \times 10^{-6}$ | 6.2 | Δ | OK |
| EXAMPLE 4 | 700 | 74.3 | ○ | DONE | $1.5 \times 10^{-5}$ | 20 | ◎ | OK |
| COMPARATIVE EXAMPLE 2 | 700 | 74.3 | ○ | NOT | $5.8 \times 10^{-6}$ | 7.8 | Δ | NG |
| EXAMPLE 5 | 750 | 81.2 | ○ | DONE | $9.3 \times 10^{-6}$ | 12 | ○ | OK |
| EXAMPLE 6 | 800 | 86.8 | Δ | DONE | $2.4 \times 10^{-5}$ | 28 | ◎ | OK |
| COMPARATIVE EXAMPLE 3 | 850 | 90.6 | X | DONE | $6.6 \times 10^{-5}$ | 73 | ◎ | NG |

TABLE 1-continued

| | FIRING TEMPERATURE (° C.) | RELATIVE DENSITY (%) | SURVIVAL OF ACTIVE MATERIAL | IMPREGNATION | IONIC CONDUCTIVITY AT ROOM TEMPERATURE σ(S · cm$^{-1}$) | IONIC CONDUCTIVITY/ DENSITY | DETERMINATION |
|---|---|---|---|---|---|---|---|
| COMPARATIVE EXAMPLE 4 | 900 | 97.7 | X | DONE | 8.0 × 10$^{-5}$ | 82 | ◉ | NG |
| COMPARATIVE EXAMPLE 5 | | ONLY POLYMER | | | 2.6 × 10$^{-7}$ | 1.1 | X | NG |

TABLE 2

| | SURVIVAL OF ACTIVE MATERIAL | IONIC CONDUCTIVITY/ RELATIVE DENSITY |
|---|---|---|
| ◉ VERY GOOD | XRD PEAK INTENSITY IS 90% OR MORE | 20 OR MORE |
| ○ GOOD | 60% OR MORE | 10 OR MORE AND LESS THAN 20 |
| Δ SO-SO | 30% OR MORE | 2 OR MORE AND LESS THAN 10 |
| X BAD | LESS THAN 30% | LESS THAN 2 |

In the comparative example 1, the firing temperature was 500 degrees C. In the example 1, the firing temperature was 550 degrees C. In the example 2, the firing temperature was 600 degrees C. In the example 3, the firing temperature was 650 degrees C. In the example 4 and the comparative example 2, the firing temperature was 700 degrees C. In the example 5, the firing temperature was 750 degrees C. In the example 6, the firing temperature was 800 degrees C. In the comparative example 3, the firing temperature was 850 degrees C. In the comparative example 4, the firing temperature was 900 degrees C.

With respect to the examples 1 to 6 and the comparative examples 1 to 4, the relative density of the phosphoric acid salt-based solid electrolyte of the solid electrolyte layer 30 was measured. In concrete, the relative density was measured by measuring a thickness, a diameter and a weight of the sample. In the comparative example 1, the relative density was 53.4%. In the example 1, the relative density was 57.5%. In the example 2, the relative density was 60.4%. In the example 3, the relative density was 68.2%. In the example 4, the relative density was 74.3%. In the comparative example 2, the relative example was 74.3%. In the example 5, the relative example was 81.2%. In the example 6, the relative density was 86.8%. In the comparative example 3, the relative density was 90.6%. In the comparative example 4, the relative density was 97.7%. From the results, it was found that the higher the firing temperature was, the higher the relative density was.

With respect to the examples 1 to 6 and the comparative examples 1 to 4, survival characteristic of the active material was measured. When XRD peak intensity caused by the active material after firing was 90% or more, the survival characteristic of the active material was determined as very good "◉". When the XRD peak intensity was 60% or more, the survival characteristic of the active material was determined as good "○". When the XRD peak intensity was 30% or more, the survival characteristic of the active material was determined as so-so "Δ". When the XRD peak intensity was less than 30%, the survival characteristic of the active material was determined as bad "X".

With respect to the examples 1 to 6 and the comparative examples 1, 3 and 4, the ionic conductivity at a room temperature was measured after the impregnation of the polymer solid electrolyte. With respect to the comparative examples 2 and 5, the ionic conductivity at a room temperature was measured without impregnation of the polymer solid electrolyte. Au electrodes were formed on both faces of each sample by sputtering. And each sample was sealed in a coin cell. The ionic conductivity was measured by measuring impedance. In the comparative example 1, the ionic conductivity was 5.7×10$^{-7}$ (S·cm$^{-1}$). In the example 1, the ionic conductivity was 1.3×10$^{-6}$ (S·cm$^{-1}$). In the example 2, the ionic conductivity was 3.1×10$^{-6}$ (S·cm$^{-1}$). In the example 3, the ionic conductivity was 4.2×10$^{-6}$ (S·cm$^{-1}$). In the example 4, the ionic conductivity was 1.5×10$^{-5}$ (S·cm$^{-1}$). In the comparative example 2, the ionic conductivity was 5.8×10$^{-6}$ (S·cm$^{-1}$). In the example 5, the ionic conductivity was 9.3×10$^{-6}$ (S·cm$^{-1}$). In the example 6, the ionic conductivity was 2.4×10$^{-5}$ (S·cm$^{-1}$). In the comparative example 3, the ionic conductivity was 6.6×10$^{-5}$ (S·cm$^{-1}$). In the comparative example 4, the ionic conductivity was 8.0×10$^{-5}$ (S·cm$^{-1}$). In the comparative example 5, the ionic conductivity was 2.6×10$^{-7}$ (S·cm$^{-1}$).

A ratio of the ionic conductivity with respect to the relative density {ionic conductivity at a room temperature (S·cm$^{-1}$)}/{relative density of phosphoric acid salt-based solid electrolyte (%)}×10$^8$ was calculated. The index is defined so that evaluation of favorable ionic conductivity is high even if the density is low. In the comparative example 1, the ratio was 1.1. In the example 1, the ratio was 2.3. In the example 2, the ratio was 5.1. In the example 3, the ratio was 6.2. In the example 4, the ratio was 20. In the comparative example 2, the ratio was 7.8. In the example 5, the ratio was 12. In the example 6, the ratio was 28. In the comparative example 3, the ratio was 73. In the comparative example 4, the ratio was 82. In the comparative example 5, the ratio was 1.1. When the ratio was 20 or more, the ionic conductivity at a low temperature was determined as very good "◉". When the ratio was 10 or more and less than 20, the ionic conductivity at a low temperature was determined as good "○". When the ratio was 2 or more and less than 10, the ionic conductivity at a low temperature was determined as so-so "Δ". When the ratio was less than 2, the ionic conductivity at a low temperature was determined as bad "X".

Total determinations of the survival characteristic of the active material and the low temperature ionic conduction were performed. When there is no "X", one of them is "◉" or both of them are "○", the total determination was OK. When there is "X", or there is no "◉" and one of them is "Δ" or less even if there is no "Δ", the total determination was NG.

As shown in Table 1, the total determinations of the examples 1 to 6 were OK. It is thought that this was because the relative density of the three dimensional network structure of the sintered compact of the phosphoric acid salt-based solid electrolyte was 55% or more and 90% or less in the solid electrolyte layer 30, and the polymer solid electrolyte including the lithium salt was impregnated into a clearance of the sintered compact. On the other hand, the total determination of the comparative example 1 was NG. It is thought that this was because the relative density of the three dimensional network structure of the sintered compact of the phosphoric acid salt-based solid electrolyte was less than 55%, and sufficient ionic conductivity was not achieved. The total determination of the comparative example 2 was NG. It is thought that this was because the polymer solid electrolyte was not impregnated, and sufficient ionic conductivity was not achieved. The total determinations of the comparative examples 3 and 4 were NG. It is thought that this was because the firing temperature was increased so that the relative density of the three dimensional network structure of the sintered compact of the phosphoric acid salt-based solid electrolyte was more than 90%, and sufficient amount of the active material was not left. The total determination of the comparative example 5 was NG. It is thought that this was because the necking of the phosphoric acid salt-based solid electrolyte was not formed, and sufficient ionic conductivity at a low temperature was not achieved.

Figure 6A:
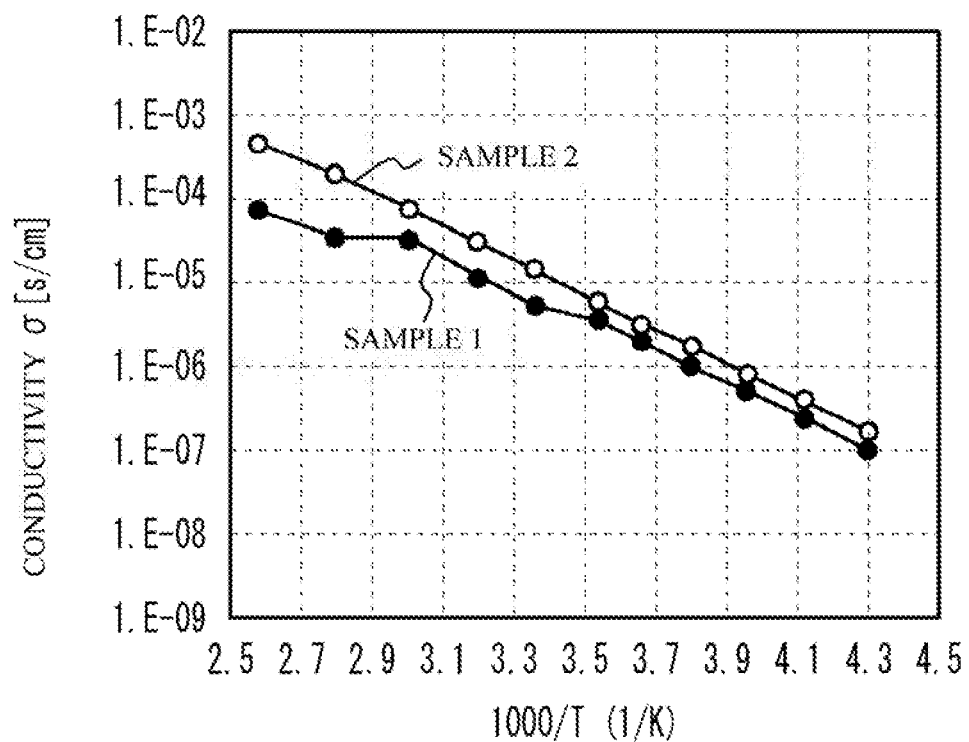
FIG. 6A and FIG. 6B illustrate a relationship between a temperature of and ionic conductivity.
Figure 6B:
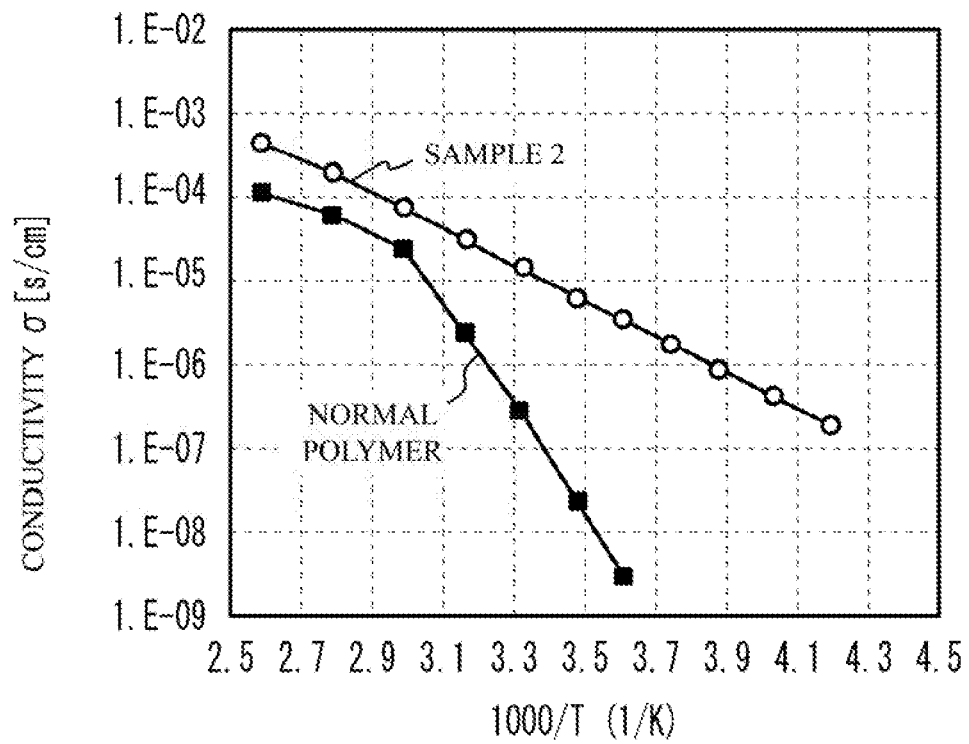

FIG. 6A and FIG. 6B illustrate a relationship between the temperature and the ionic conductivity. A sample 1 indicates the result of the comparative example 2. A sample 2 indicates the result of the example 4. Generally, polymer indicates a relationship like the results of the comparative example 5. In FIG. 6A and FIG. 6B, a horizontal axis indicates an inverse number of the temperature. A vertical axis indicates the ionic conductivity. From the result of FIG. 6A, it is understood that favorable ionic conductivity is obtained when the polymer solid electrolyte is impregnated in every temperature. From the result of FIG. 6B, it is understood that the ionic conductivity is reduced at a low temperature when the three dimensional network structure of the phosphoric acid salt-based solid electrolyte is not provided.

Although the embodiments of the present invention have been described in detail, it is to be understood that the various change, substitutions, and alterations could be made hereto without departing from the spirit and scope of the invention.

What is claimed is:

1. An all solid battery comprising:
    a solid electrolyte layer including solid electrolyte;
    a first electrode layer that is formed on and in contact with a first main face of the solid electrolyte layer and includes a first sintered active material; and
    a second electrode layer that is formed on and in contact with a second main face of the solid electrolyte layer and includes a second sintered active material,
    wherein the solid electrolyte layer includes polymer solid electrolyte including lithium salt, in a clearance of a sintered compact of phosphoric acid salt-based solid electrolyte.

2. The all solid battery as claimed in claim 1, wherein the sintered compact has a three dimensional network structure of which a relative density is 55% or more and 90% or less.

3. The all solid battery as claimed in claim 1, wherein, in the solid electrolyte layer, {ionic conductivity at a room temperature $(S \cdot cm^{-1})$}/{relative density of phosphoric acid salt-based solid electrolyte (%)}$\times 10^8$ is 2 or more.

4. The all solid battery as claimed in claim 1, wherein the phosphoric acid salt-based solid electrolyte has a NASICON structure.

5. The all solid battery as claimed in claim 1, wherein at least one of the first sintered active material and the second sintered active material includes has an olivine type crystal structure.

6. The all solid battery as claimed in claim 1, wherein the first electrode layer and the second electrode layer include an oxide-based solid electrolyte material.

7. The all solid battery as claimed in claim 1, wherein a glass transition temperature of the polymer solid electrolyte is less than 40 degrees C.

8. A manufacturing method of an all solid battery comprising:
    forming a sintered compact of phosphoric acid salt-based solid electrolyte from a green sheet including grains of the phosphoric acid salt-based solid electrolyte, by firing a multilayer structure in which first coated electrode paste, the green sheet and second coated electrode paste are stacked in this order; and
    impregnating precursor solution of polymer solid electrolyte including lithium salt, into a clearance of the sintered compact.

9. The method as claimed in claim 8, wherein a relative density of the sintered compact is 55% or more and 90% or less.

10. The method as claimed in claim 8, wherein a firing temperature of the multilayer structure in the firing is 550 degrees C. or more and 800 degrees C. or less.

* * * * *